May 17, 1955  E. E. SCHIESEL  2,708,591
BALL JOINT FITTING
Filed March 20, 1952

INVENTOR.
ERVIN E. SCHIESEL
BY
ATTORNEY.

United States Patent Office 2,708,591
Patented May 17, 1955

2,708,591

BALL JOINT FITTING

Ervin E. Schiesel, Meriden, Conn., assignor to The Mattatuck Mfg. Co., Waterbury, Conn., a corporation of Connecticut Application March 20, 1952, Serial No. 277,576

1 Claim. (Cl. 287—90)

This invention relates to ball joints, and more particularly to a ball end fitting to form a joint such as may be used for connecting a link to a connecting rod.

One object of the present invention is to provide a ball end fitting of the above nature which will eliminate superfluous parts and reduce the amount of metal necessary for producing an effective ball joint fitting.

A further object is to provide a device of the above nature which will be easy to adjust and lock in any desired position.

A further object is to provide a device of the above nature in which the outer casing may be crimped in any desired adjusted position by means of a plurality of slotted ears arranged around the end of the casing which ears are adapted to be pressed inwardly by means of a pair of pliers or other suitable tool.

A further object is to provide a device of the above nature in which a considerable reduction in assembly time will be permitted by substituting a simple crimp for the previously employed cotter pins which were required to be inserted through apertures and bent over at their ends.

A further object is to provide a device of the above nature in which the ball socket retainer on the end of the rod will be self-aligning due to the two-piece construction of the ball housing, thus allowing for an infinite adjustment in length between the retainer and the connecting rod.

A further object is to provide a device of the above nature which will be simple in construction, inexpensive to manufacture, easy to install and manipulate, compact, ornamental in appearance, which will provide substantially frictionless tracking, in which the casing may swivel freely, and which will be very efficient and durable in use.

With these and other objects in view, there have been illustrated on the accompanying drawing, three forms in which the invention may conveniently be embodied in practice.

Figure 1:
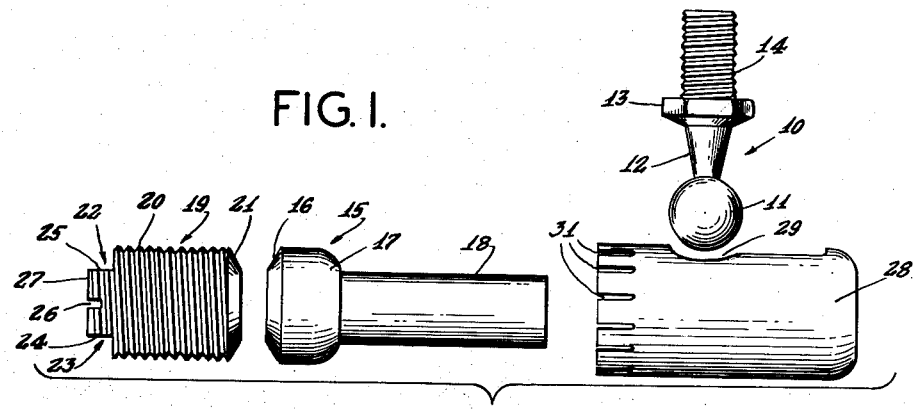
Fig. 1 represents an exploded side view of the improved ball joint fitting, including the inner and outer ball seats for the ball rod and the retaining shell.

Referring now to the drawing in which like reference numerals denote corresponding parts throughout the several views, the numeral 10 indicates a ball rod which is adapted to be connected to a linkage (not shown), said ball rod having a spherical ball 11 on the lower end thereof. The ball 11 is connected to a reduced tapered neck 12 which is joined at its outer end to a polygonal flange 13, above which is a threaded screw section 14.

Referring more particularly to Fig. 1 of the drawing, the ball joint includes an inner ball seat 15 having a beveled outer rim 16 and a rounded rear section 17. The rear end of the inner ball seat member is tapped at 18 to engage a threaded connecting rod (not shown) so as to permit the length of said rod to be adjusted.

Provision is also made of an outer ball seat 19 made from solid stock having exterior threads 20, and a beveled inner end 21.

The outer end of the outer ball seat 19 is provided with a pair of opposed recesses 22, 23, but it is within the spirit of the invention to employ four or any other number of such recesses, if desired.

The recesses 22, 23 of the outer ball seat 19 are provided with two flat faces 24, 25, for a purpose to be hereinafter described. The outer ball seat 19 has a flat end 27 provided with a screw driver receiving slot 26.

In order to lock the outer seat 19 loosely against the ball 11 with a clearance of from .002 to .005 of an inch when said ball is seated tightly in the inner seat 15, provision is made of a shell 28, preferably formed by stamping from sheet metal and having an elongated keyhole-shaped aperture 29 in its side, said aperture 29 being adapted to embrace the tapered neck 12 of the ball rod 10 in order to permit the latter to swing with a limited universal motion.

Figures 2, 3:
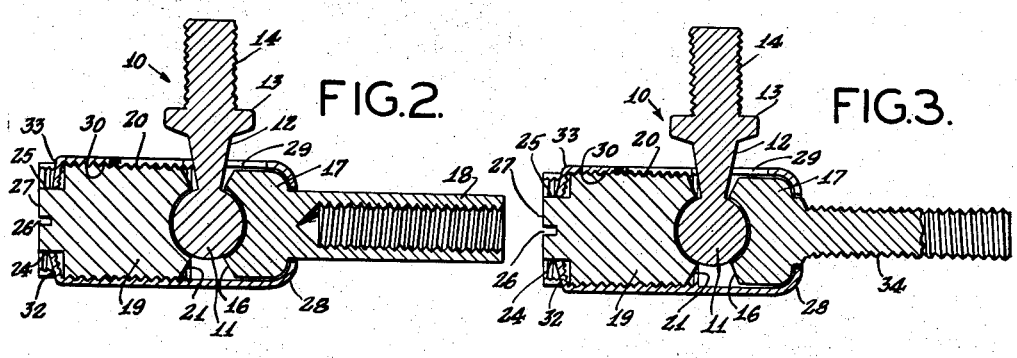
Fig. 2 is a longitudinal sectional view of the same, showing the reduced tapped end of the inner ball seat.
Fig. 3 is a longitudinal sectional view of a modified form of ball joint fitting in which the inner ball seat comprises a reduced externally threaded rod instead of the tapped rod as shown in Figs. 1 and 2.
Figure 5:
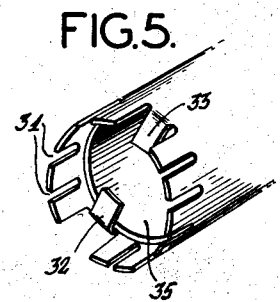
Fig. 5 is a perspective view of the same showing its appearance after two opposed ears of the retaining shell have been crimped inwardly around the outer ball seat.

The shell 28 is provided with a tapped inner surface 30 for engaging the exterior thread 20 of the outer ball seat 19, and the outer end of the shell 28 is provided with a plurality of longitudinal slots 31 from which a plurality (two in this instance) of ears 32, 33 may be bent inwardly at an angle to crimp tightly against the faces 24, 25 of the outer ball seat 19 (Fig. 2).

In the modified form of the invention shown in Fig. 3, the construction is identical to that of Fig. 1, except that the inner ball seat 34 has an externally threaded end instead of a tapped end.

Figure 4:
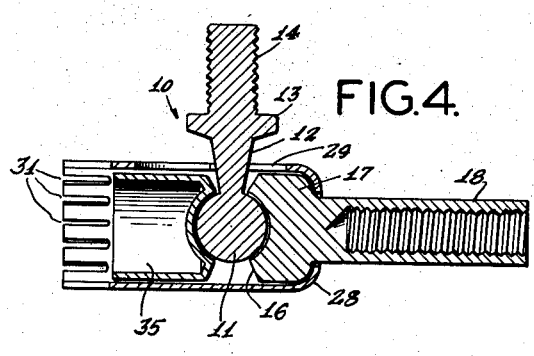
Fig. 4 is a longitudinal sectional view of another modified form of ball joint fitting in which the outer ball seat, instead of being threaded, is formed from a sheet metal stamping having a hollow unthreaded interior.

In the modified form of the invention shown in Fig. 4, the invention is similar to that shown in Fig. 1, except that the outer ball seat 35, instead of being formed from a solid plug, is made hollow by stamping from sheet metal to reduce the weight thereof. It also is unthreaded, and is held in locked position by bending a pair of opposed ears 32, 33 inwardly around the outer end of the tubular ball seat 35.

While there have been disclosed in this specification several forms in which the invention may be embodied, it is to be understood that these forms are shown for the purpose of illustration only, and that the invention is not to be limited to the specific disclosures, but may be modified and embodied in various other forms without departing from its spirit. In short, the invention contains all the modifications and embodiments coming within the scope of the following claim.

Having thus fully described the invention, what is claimed as new, and for which it is desired to secure Letters Patent, is:

In a ball fitting for joining a link to a connecting rod for universal motion, a rockable side rod having a ball on one end thereof, the other end of said rod being threaded for connection to a movable driving link, an elongated hollow cylindrical shell of thin metal having a keyhole aperture loosely embracing said side rod, a pair of cooperating spaced inner and outer ball seat members fitted within said shell, the inner seat member having an elongated stem extending through an opening in the inner end of said shell for connection with said connecting rod, the inner end of said shell surrounding said stem being bent inwardly to embrace said inner ball seat member and said stem, the outer end of said shell being open and having a plurality of spaced longitudinal slots forming ears between said slots, the open end of said shell having internal threads, the outer ball seat having external threads engaging the internal threads of said shell, said outer ball seat being provided at its outer end with a transverse projection having at least one flat side face, said projection having a screw driver receiving slot, at least one of said ears being crimped inwardly into abutment with the flat side face of said projection on said outer ball seat member so as to positively prevent turning of said outer ball seat member from any preadjusted position.

References Cited in the file of this patent

UNITED STATES PATENTS

| | | |
|---|---|---|
| 1,337,138 | Kaps | Apr. 13, 1920 |
| 1,673,268 | Rouanet | June 12, 1928 |
| 2,014,464 | Bierbach | Sept. 17, 1935 |
| 2,066,695 | Peo | Jan. 5, 1937 |

FOREIGN PATENTS

| | | |
|---|---|---|
| 503,864 | France | June 19, 1920 |
| 574,091 | France | July 4, 1924 |
| 656,574 | Germany | Feb. 9, 1938 |
| 942,939 | France | Feb. 22, 1949 |